(No Model.)
W. B. NORTON.
BREAK JOINT LEVER.
No. 455,728. Patented July 7, 1891.
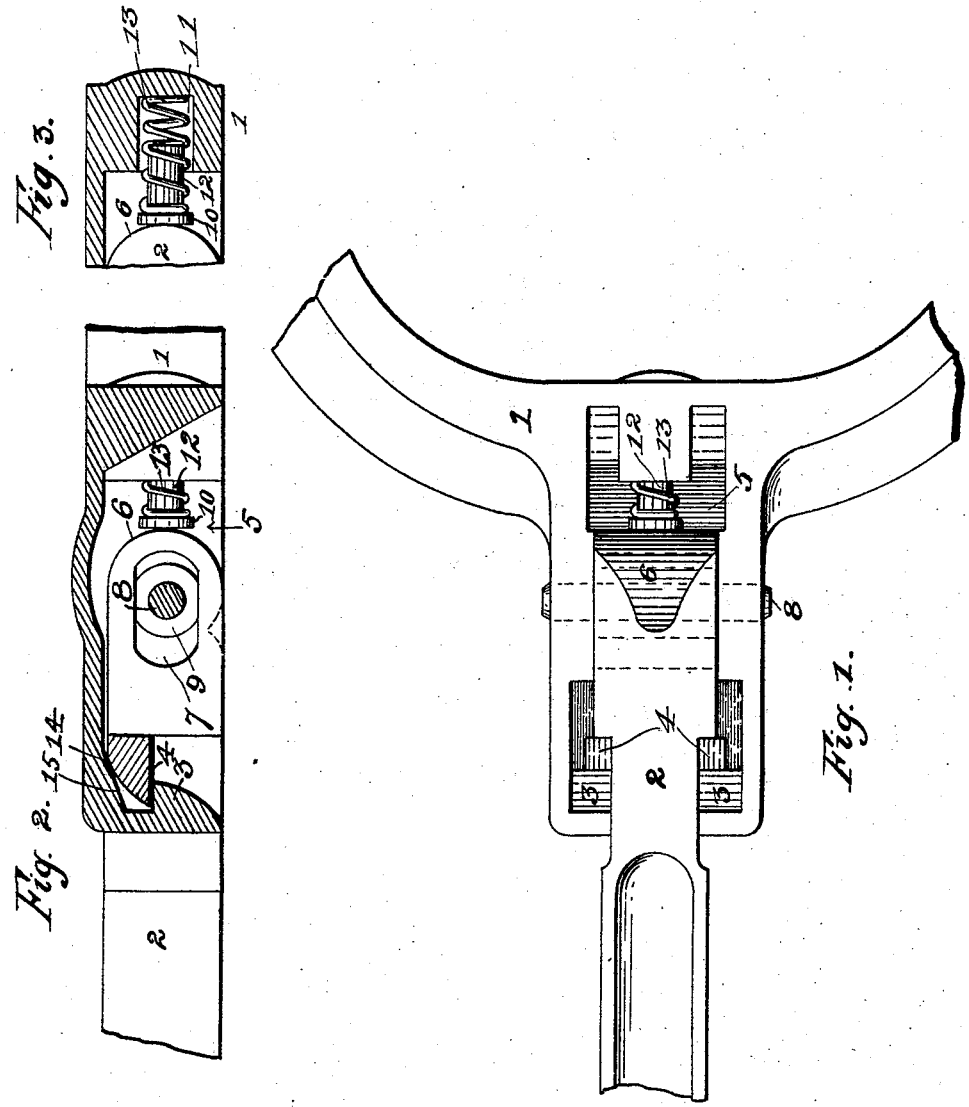
Witnesses
S. M. Wood
E. W. Green
Inventor
William B. Norton.
Attorneys

UNITED STATES PATENT OFFICE.

WILLIAM B. NORTON, OF MANCHESTER, CONNECTICUT, ASSIGNOR TO THE BROSIUS MOTOR SEWING MACHINE COMPANY, OF ATLANTA, GEORGIA.

BREAK-JOINT LEVER.

SPECIFICATION forming part of Letters Patent No. 455,728, dated July 7, 1891.

Application filed March 25, 1891. Serial No. 386,397. (No model.)

*To all whom it may concern:*

Be it known that I, WILLIAM B. NORTON, a citizen of the United States, and a resident of Manchester, in the county of Hartford and State of Connecticut, have invented certain new and useful Improvements in Break-Joints for Motor Winding-Levers; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to levers, having particular reference to making a joint therein which may be made rigid or flexible at the will of the operator, the details of which will be hereinafter fully specified.

In the accompanying drawings, Figure 1 is an inverted plan view of the jointed portion of a bifurcated lever. Fig. 2 is a section longitudinally and vertically cut on the line of the right-hand side of the straight portion of the lever, showing the locking device. Fig. 3 is a section through the bifurcated portion of said lever on a line with the center of the straight portion of said lever.

In the figures like reference-characters are employed in the designation of corresponding elements throughout the drawings.

The lever consists of two parts or members 1 and 2. The member 1, which is attached to the element to be operated upon, is provided with a rectangular-shaped recess 5 on its under side if the lever is to brake downwardly, the distal end wall of said recess being partially cut away to permit of the introduction of the member 2, as will be hereinafter specified. Lips 3 project from the portion of the end wall not cut away, projecting therefrom in a direction longitudinally of the lever. The lever 2 is adapted to fit at its end within the recess 5 and has lips 4 correlative with the lips 3, and hence adapted to engage therewith when the member 2 is pressed forward, as presently understood. Said lever 2 is provided with a rounded surface 6 on its end, and near said end is a transversely-extending slotted hole 7. A pin 8 passes through the walls of the recess 5 and through the flat nut 9 in the slot 7, said nut 9 turning on said pin 8 with the part 2 of the lever, as said part 2 is partially revolved upon said pin as a pivot, and the flat ends of said nut also contact with the side walls of the slot 7, forming a bearing-box between said pin and the side walls of said slot. By means of the slot and pivot therein the member 2 obviously has two motions—namely, to move to and from engagement of lips 4 with the lips 3, and so that said member 2 may be released and allowed to swing vertically by pressing on the end thereof and causing the disengagement of said projections 3 and 4. This motion is resisted by a block 10, (concaved, if desired, on its end to fit the rounded portion 6 of the lever,) said block sliding in a hole 11 in the other end wall of the recess 5, a pin 12 being set within said hole and secured to said block, a coiled spring 13 inclosing said pin and resting on the bottom of said hole 11 and on the back of the block.

The back or top portions of the lips 4 have contact-point 14, and the wall of the recess is inclined at 15, so that the forcing of the lever 2 outward by the spring 13 will force the said lips 4, bearing on the lips 3, into contact with the inclined surface 15, which acts to press the two sets of lips 3 and 4 into contact, thus taking up any lost movement between the parts.

Having thus described my invention, what I claim as new, and desire to secure by Letters Patent of the United States, is—

1. In a device of the class specified, the two-part lever, one part provided with a recess and a transverse pivot-pin therein and a lip projecting into said recess, and the other part adapted to enter said recess and having a slot engaging with and having play upon said pivot-pin and a lip secured thereto in apposition to said lip projecting into said recess, substantially as and for the purpose specified.

2. In a device of the class specified, the two-part lever pivoted together intermediately in such a manner that one part has longitudinal movement relative to the other, lips, one upon each of said two parts and adapted to alternately engage and disengage upon the successive movement in opposite directions of one part of said lever, and means for normally holding the said lips in engagement, consisting of a spring-pressed piston set in one part of said lever and bearing upon the other, substantially as shown and described.

3. In a device of the class specified, the two-part lever, one part having a recess in its end and an inclined surface therein in apposition to the working-face of a clutching-lip also in said recess, the other part fitting and pivoted within said recess and carrying a lip thereon adapted to engage with the said lip in the recess and having a point on its back side adapted to contact with the said inclined surface, and means for elastically pressing said elements into engagement, all combined, arranged, and operating substantially as and for the purpose specified.

In testimony whereof I hereunto affix my signature in presence of two witnesses.

WILLIAM B. NORTON.

Witnesses:
A. P. WOOD,
A. A. WOOD.